Figure 1:
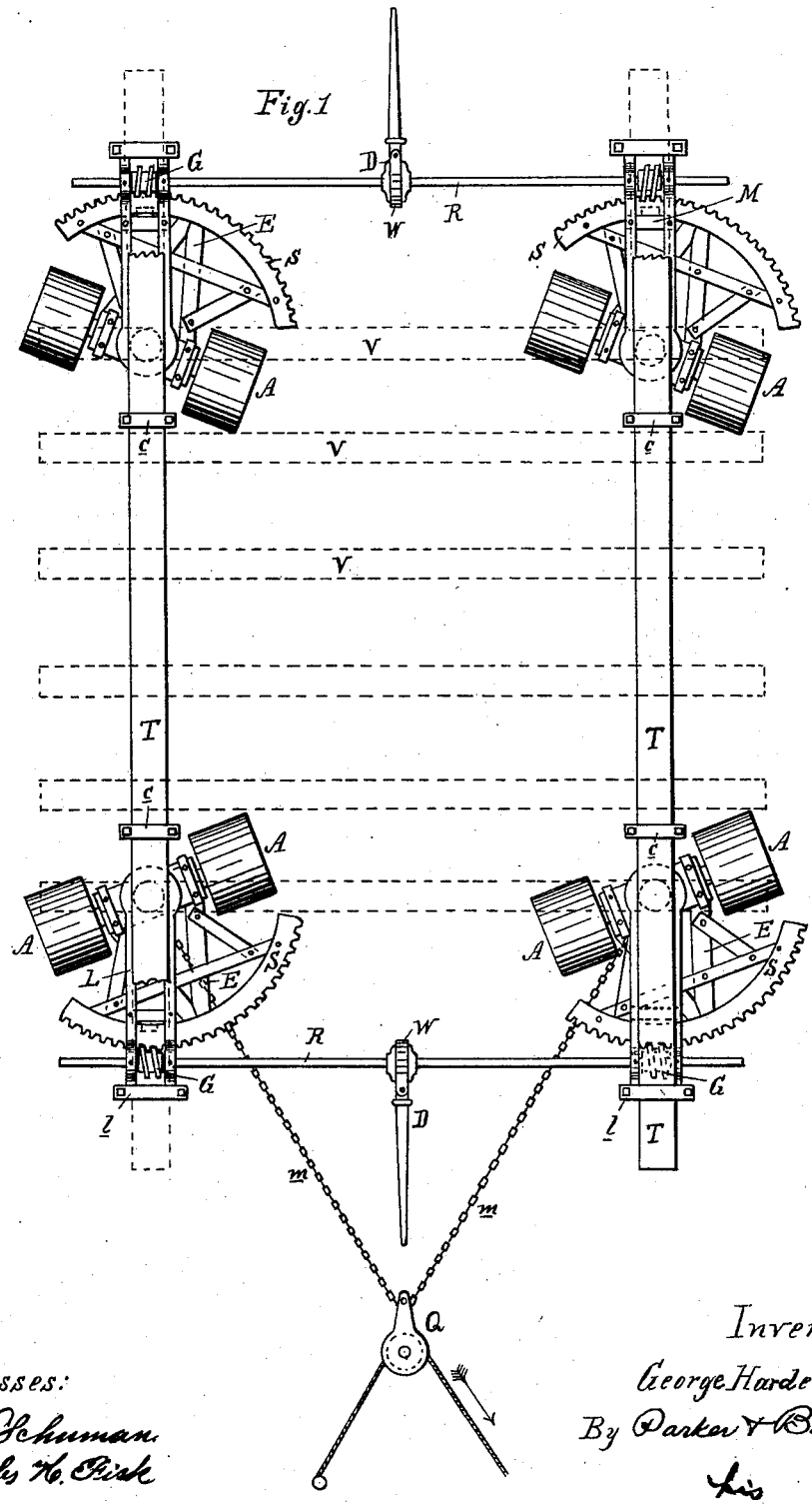

(No Model.) 2 Sheets—Sheet 1.

G. HARDEN.
TRUCK FOR MOVING BUILDINGS.

No. 389,568. Patented Sept. 18, 1888.

Witnesses:
John Schuman
Charles H. Fisk

Inventor:
George Harden.
By Parker & Burton
his Att'ys (No Model.) 2 Sheets—Sheet 2.
G. HARDEN.
TRUCK FOR MOVING BUILDINGS.
No. 389,568. Patented Sept. 18, 1888.
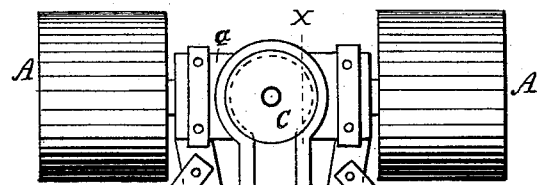
Fig. 2
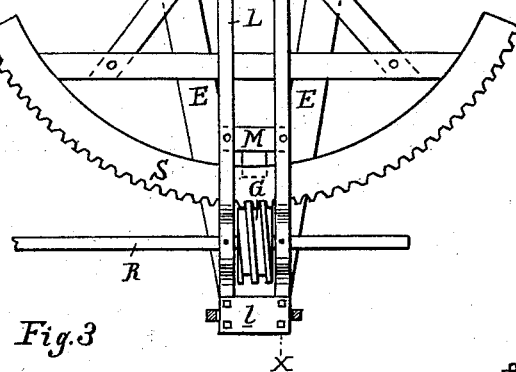
Fig. 3
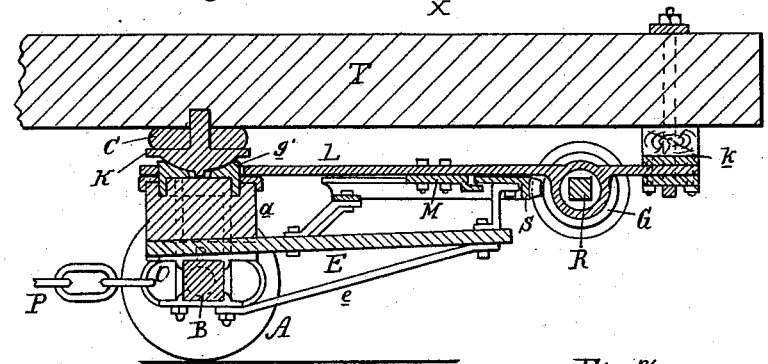
Fig. 7
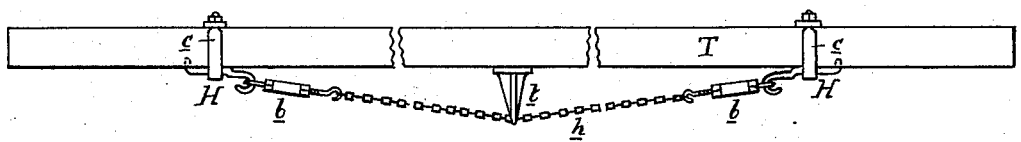
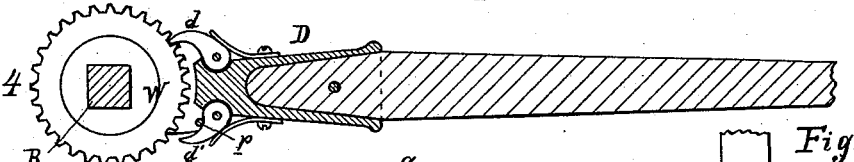
Fig. 4
Fig. 6
Fig. 5
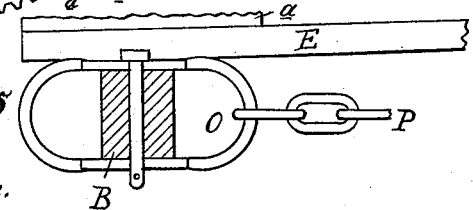
Witnesses:
John Schuman.
Charles H. Fisk.
Inventor:
George Harden.
By Parker & Burton
his Att'ys

UNITED STATES PATENT OFFICE.

GEORGE HARDEN, OF DETROIT, MICHIGAN.

TRUCK FOR MOVING BUILDINGS.

SPECIFICATION forming part of Letters Patent No. 389,568, dated September 18, 1888.

Application filed May 5, 1888. Serial No. 272,950. (No model.)

*To all whom it may concern:*

Be it known that I, GEORGE HARDEN, a citizen of the United States, residing at Detroit, in the county of Wayne and State of Michigan, have invented a new and useful Improvement in Trucks for Moving Buildings, of which the following is a specification.

This invention relates to new and useful improvements in compound trucks for moving buildings, and is particularly designed to enable the operator by its use to guide the truck in any direction with facility, the individual trucks supporting the main frame being divided into pairs, of which the pair located under either end of the compound truck will always have the axles parallel to each other.

In the drawings, Figure 1 is a plan view of the compound truck. Fig. 2 is an enlarged detailed plan view of a single truck. Fig. 3 is a vertical section of a single truck through the line $x\,x$ of Fig. 2. Fig. 4 is a detail of the lever used in working the gear upon the individual truck. Figs. 5 and 6 are two views of the draft connection; and Fig. 7 represents a tie-brace, which I use for stiffening the longitudinal timbers of the compound truck.

T is a longitudinal reach-timber connecting one truck of the forward pair of trucks to one truck of the rearward pair of trucks. There are two of these timbers, one on either side of the compound truck.

The four individual trucks which unite in forming the compound truck are alike, and a description of the details of one of them will sufficiently describe all of them. The wheels A A are mounted upon a square-bodied axle, B. Upon the top of the axle B is mounted hounds, E, to the forward end of which, by suitable holding-braces, is attached a toothed arc, S, of about one hundred and twenty degrees. The inner side of the toothed arc is held up by a supporting-clip, M, bolted to the gear-holder L. The gear-holder L extends from the axle, which is built up by means of a timber, $a$, sufficiently high to enable the gear-holder L to clear the top of the wheels A A forward to a position somewhat beyond the outside of the toothed arc S, and is there held firmly to the timber T by a clip, $k$. The gear-holder L carries suitable boxes for supporting a shaft, R, carrying the worm-gear G, that meshes into the teeth of the toothed arc S. At its inner end the gear-holder L embraces a circular bolster-plate mounted on the top of the timber A, and by means of this connection the individual truck is held to the reach-timber T, but can be oscillated through an angle of one hundred and twenty degrees.

Two similar trucks are mounted at each end of the compound truck, and the worm-gears controlling the movement of the toothed arc upon the two trucks at either end are connected by the rod R, which moves both of the individual trucks of the pair simultaneously, when the rod R is itself turned by means of the lever D and the pallet $d$ or $d'$. The lever D is held to the rod R by a ring, and the pallets $d\,d'$ engage in the teeth of a ratchet-wheel, W, mounted upon the rod R, and enables the workman to rotate the rod R. The workman uses only one of the pallets $d\,d'$ at a time, throwing the one which he is not using back and holding it out of engagement with the ratchet-wheel W by means of a pin, $p$.

The top of the bolster-plate $g$ that holds the gear-holder L to the axle is concave, and in the concavity I place a plate, K, of peculiar shape. On its lower side the plate K is convex to fit the concavity in the bolster-plate $g$. At its center there is a boss arranged to fit loosely in a depression in the center of the plate $g$. Its upper surface is nearly plane, but from its center rises a large bolt which holds in place an annular rubber spring, C, and which also passes up for a short distance into the timber T and aids in holding the timber T into position upon the truck.

The peculiar shape of the bolster-plate $g$ and casting K, with the boss on its lower side fitting loosely into the depression in plate $g$, permits a small change in the angularity between the axle and the cross-timbers of the frame, and prevents a wrenching-strain should either of the wheels of the truck fall into a depression in the roadway.

In order to render the timbers T T more rigid, I strengthen them by means of tension-braces. The tension-brace on each timber is formed by holding the ends of the chain $h$ by clip C and hook H to the timber near its ends. The middle part of the chain $h$ is held away from the timber by a hanger, $t$, and tension is put upon the chain $h$ by means of turn-buckles $b\ b$. This enables me to use lighter timbers and gives better results than could be obtained were the timber unsupported by any strengthening-brace.

Cross-timbers V V V lie from one timber T to the other, and with them form a frame-work and support the building to be moved.

The draft is applied to the axle by means of a chain, $m\ m$, passing from the clevis O, mounted centrally upon the axle of one truck of a pair through a sheave, Q, to a similar clevis similarly mounted upon the other axle of the truck.

Having thus described my invention, what I claim as novel is—

1. In a truck for moving houses, a main frame mounted upon four trucks, each of which carries a toothed arc concentric with its axis of oscillation, each toothed arc meshing into a worm-gear by which it is moved around the axis of oscillation of the truck.

2. In a truck for moving houses, a main frame mounted upon four trucks, of which the two forward ones are oscillated with their axles constantly parallel, substantially as and for the purposes described.

3. In a truck for moving houses, a main frame mounted upon four trucks connected in front and rear pairs, each pair being geared and connected so that the axles of each pair remain constantly parallel, substantially as and for the purposes described.

4. In a compound truck for moving houses, in combination with a timber reaching from one forward to one rear individual truck, a strengthening tie-brace consisting of the tie $h$, held to the timber by hook H and clip C, and held away from the timber at its middle part by hanger $t$, substantially as and for the purposes described.

5. In a compound truck for moving houses, the combination of the individual truck, the reach-timber T, spring C, and casting K, substantially as and for the purposes described.

GEO. HARDEN.

Witnesses:
CHARLES F. BURTON,
CHARLES H. FISK.